United States Patent
Müller et al.

(10) Patent No.: US 9,471,467 B2
(45) Date of Patent: Oct. 18, 2016

(54) EVALUATION OF AN APPLICATION

(71) Applicant: TELEFONAKTIEBOLAGET L M ERICSSON (PUBL), Stockholm (SE)

(72) Inventors: Frank Müller, Upplands-Väsby (SE); Mats Zachrison, Örebro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/325,054

(22) Filed: Jul. 7, 2014

(65) Prior Publication Data

US 2016/0004624 A1  Jan. 7, 2016

(51) Int. Cl.
| | |
|---|---|
| G06F 9/45 | (2006.01) |
| G06F 11/36 | (2006.01) |
| H04W 76/04 | (2009.01) |
| H04W 24/08 | (2009.01) |
| H04W 16/18 | (2009.01) |
| H04W 16/22 | (2009.01) |

(52) U.S. Cl.
CPC ......... *G06F 11/3668* (2013.01); *H04W 16/18* (2013.01); *H04W 16/22* (2013.01); *H04W 24/08* (2013.01); *H04W 76/046* (2013.01)

(58) Field of Classification Search
None
See application file for complete search history.

(56) References Cited

U.S. PATENT DOCUMENTS

| | | | |
|---|---|---|---|
| 2006/0217116 A1* | 9/2006 | Cassett | H04L 41/5009 455/423 |
| 2006/0224730 A1* | 10/2006 | Fok et al. | 709/224 |
| 2006/0259629 A1* | 11/2006 | Usmani | G06F 11/3688 709/227 |
| 2012/0151035 A1* | 6/2012 | Puthenpura et al. | 709/224 |
| 2012/0151041 A1* | 6/2012 | Gerber et al. | 709/224 |

* cited by examiner

*Primary Examiner* — Isaac T Tecklu (57) ABSTRACT

It is presented a method for evaluating an application intended to be installed in a wireless terminal of a cellular network. The method is performed in an application development device and comprises the steps of: obtaining performance data associated with an execution of the application in a test wireless terminal in a simulated or real cellular network, the performance data being obtained for each cellular data session of the execution of the application, each cellular data session being defined as a period when the test wireless terminal is in a cellular network connection state when data transfer is possible; and evaluating the performance data by comparing the in performance data with reference performance data, the comparison being based on the duration of each cellular data session.

12 Claims, 4 Drawing Sheets

EVALUATION OF AN APPLICATION

TECHNICAL FIELD

The invention relates to a method, an application development device, a computer program and a computer program product for evaluating an application intended to be installed in a wireless terminal of a cellular network.

BACKGROUND

The smartphone application market has exploded in the last few years, with a myriad of entertaining and useful applications for smartphone users, mostly provided at a reasonable cost.

The development of the applications is simplified by the provision of software development kits (SDKs) to simplify for developers to develop and maintain applications.

However, not much focus has been given to network efficiency or application performance for applications. Hence, many applications consume network resources in a far from optimal way. This not only consumes excess resources for the user of the application, but also for other users, since cellular network resources are shared among many users. Moreover, the battery consumption is increased with inefficient network resource usage.

To design and develop applications that are efficient for the cellular network is a complex task that requires detailed knowledge in how cellular networks execute requests, deals with bursty traffic, handle idling users, and much more.

SUMMARY

It is an object to provide a way for the developer to conveniently evaluate cellular network performance of an application.

According to a first aspect, it is presented a method for evaluating an application intended to be installed in a wireless terminal of a cellular network. The method is performed in an application development device and comprises the steps of: obtaining performance data associated with an execution of the application in a test wireless terminal in a simulated or real cellular network, the performance data being obtained for each cellular data session of the execution of the application, each cellular data session in being defined as a period when the test wireless terminal is in a cellular network connection state when data transfer is possible; and evaluating the performance data by comparing the performance data with reference performance data, the comparison being based on the duration of each cellular data session. In this way, the application is evaluated in terms of impact in the cellular network, allowing the application developer to adjust the code of the application, e.g. to reduce the cellular data session time required to transfer the desired data.

The method may further comprise the step of: presenting a result of the evaluating of performance data.

In the step of obtaining performance data, the performance data may comprise a measurement of data transfer magnitude.

In the step of obtaining performance data, the performance data may comprise at least one of the following: number of transferred uplink bytes, number of transferred downlink bytes, time spent in a specific cellular network connection state, number of transitions of cellular network connection states, downlink energy estimate, and uplink energy estimate.

The cellular network connection states when data transfer is possible may be only CELL_FACH, a state when a Forward Access Channel is available, and CELL_DCH, a state when Dedicated Channel is available.

The cellular network connection state when data transfer is possible may consist of a single state of an RRC_CONNECTED, Radio Resource Control Connected, state.

The step of evaluating the performance may comprises comparing the performance data with a strict subset of the reference performance data, the strict subset being in defined by a range of durations of the cellular data sessions, for reference performance data, in which the duration of the cellular data session falls.

According to a second aspect, it is presented an application development device arranged to evaluate an application intended to be installed in a wireless terminal of a cellular network. The application development device comprises: a processor; and a memory storing instructions that, when executed by the processor, cause the application development device to: obtain performance data associated with an execution of the application in a test wireless terminal in a simulated or real cellular network, the performance data being obtained for each cellular data session of the execution of the application, each cellular data session being defined as a period when the test wireless terminal is in a cellular network connection state when data transfer is possible; and evaluate the performance data by comparing the performance data with reference performance data, the comparison being based on the duration of each cellular data session.

The instructions stored in the memory of the application development device, when executed by the processor, may further cause the application development device to: present a result of the evaluating of performance data.

The instructions to obtain may comprise instructions that, when executed by the processor, cause the application development device to obtain performance data comprising a measurement of data transfer magnitude.

The instructions to obtain may comprise instructions that, when executed by the processor, cause the application development device to obtain performance data comprising at least one of the following: number of transferred uplink bytes, number of in transferred downlink bytes, time in spent in a specific cellular network connection state, number of transitions of cellular network connection states, downlink energy estimate, and uplink energy estimate.

The instructions to obtain performance data may comprise instructions that, when executed by the processor, cause the application development device to consider the cellular network connection states when data transfer is possible are only CELL_FACH, a state when Forward Access Channel is available, and CELL_DCH, a state when Dedicated Channel is available.

The instructions to obtain performance data may comprise instructions that, when executed by the processor, cause the application development device to consider the cellular network connection states when data transfer is possible to consist of a single state of an RRC_CONNECTED, Radio Resource Control Connected, state.

The instructions to evaluate the performance may comprise instructions that, when executed by the processor, cause the application development device to compare the performance data with a strict subset of the reference performance data, the strict subset being defined by a range of durations of the cellular data sessions, for reference performance data, in which the duration of the cellular data session falls.

According to a third aspect, it is presented an application development device comprising: means for obtaining performance data associated with an execution of an application in a test wireless terminal in a simulated or real cellular network, the application being intended to be installed in a wireless terminal of a cellular network, the performance data being obtained for each cellular data session of the execution of the application, each cellular data session being defined as a period when the test wireless terminal is in a cellular network connection state when data transfer is possible; and in means for evaluating the performance data by comparing the performance data with reference performance data, the comparison being based on the duration of each cellular data session.

According to a fourth aspect, it is presented a computer program product for evaluating an application intended to be installed in a wireless terminal of a cellular network. The computer program product comprises a non-transitory computer-readable medium having instructions thereon, the instructions comprising code for obtaining performance data associated with an execution of the application in a test wireless terminal in a simulated or real cellular network, the performance data being obtained for each cellular data session of the execution of the application, each cellular data session being defined as a period when the test wireless terminal is in a cellular network connection state when data transfer is possible; and code for evaluating the performance data by comparing the performance data with reference performance data, the comparison being based on the duration of each cellular data session.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers in refer to like elements throughout the description.

Figure 1:
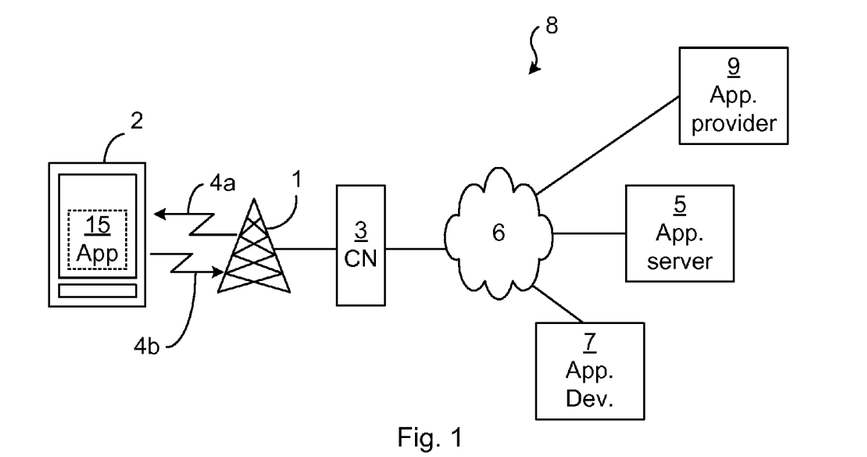
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more radio network nodes 1, here in the form of radio base stations being evolved Node Bs, also known as eNode Bs or eNBs. The radio network node 1 could also be in the form of Node Bs, BTSs (Base Transceiver Stations) and/or BSSs (Base Station Subsystems), etc. The radio network node 1 provides radio connectivity over a wireless interface 4a-b to a plurality of wireless terminals 2. The term wireless terminal is also known as mobile communication terminal, user equipment (UE), mobile terminal, user terminal, user agent, wireless device, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless terminal 2 can comprise a number of wires for internal and/or external purposes.

The cellular network 8 may e.g. comply with any one or a combination of LTE (Long Term Evolution), W-CDMA (Wideband Code Division Multiple Access), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, uplink (UL) communication 4b occurs from the wireless terminal 2 to the radio network node 1 and downlink (DL) communication 4a occurs from the radio network node 1 to the wireless terminal 2. The quality of the wireless radio interface to each wireless terminal 2 can vary over time and depending on the position of the wireless terminal 2, due to effects such as fading, multipath propagation, interference, etc.

The radio network node 1 is also connected to the core network 3 for connectivity to central functions and a wide area network 6, such as the Internet.

There is also an application development device 7 connected to the wide area network 6. The application development device 7 provides an environment for a software developer to be able to develop an application 15 (also known as app) which is a software program which can be installed in the wireless terminal 2. The installation can occur by the application developer publishing the application using an application provider 9. The user of the wireless device 2 can then find the application using the application provider 9 and install the application 15 in the wireless device 2. The application provider can e.g. be an application repository such as Google Play or Apple App Store.

When the application 15 is executing in the wireless device, it will on occasion communicate with an application server 5, e.g. to retrieve data, store data, or request certain functionality from app server, etc. The wireless device 2 will then communicate uplink 4b and downlink 4a via the radio network node 1, core network and the wide area network 6 to reach the application server 5. Depending on how the application 15 has been developed, the cellular network 8 can be better or worse utilised. As is explained in further detail below, the application developer using the application development device 7 thus needs guidance as to how efficient the application 15 is when utilising the cellular network 8.

Figure 2:
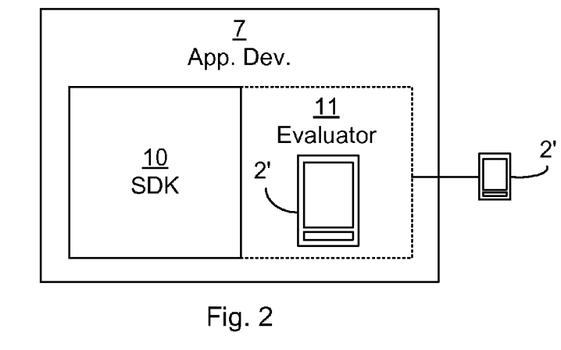
FIG. 2 is a schematic diagram illustrating functional components of the application development device of FIG. 1.

FIG. 2 is a schematic diagram illustrating functional components of the application development device of FIG. 1. The application development device 7 here comprises a software development kit (SDK) 10 which is a software program executing in the in application development device 7. There is also here an evaluator 11 which is used to evaluate (also known as benchmark) an application with regard to efficiency of using a cellular network. The evaluator uses a test wireless terminal 2' to collect performance data when the application executes. The test wireless terminal 2' can be a simulated wireless terminal forming part of a simulated cellular network within the evaluator 11, or it can be a real, physical, wireless device in communication with the application development device 7 using a real cellular network as shown in FIG. 1.

The evaluator 11 can be included within the SDK 10 or it can be a separate software program. In any case, an application developed using the SDK 10 can be evaluated using the evaluator 11.

Figure 3:
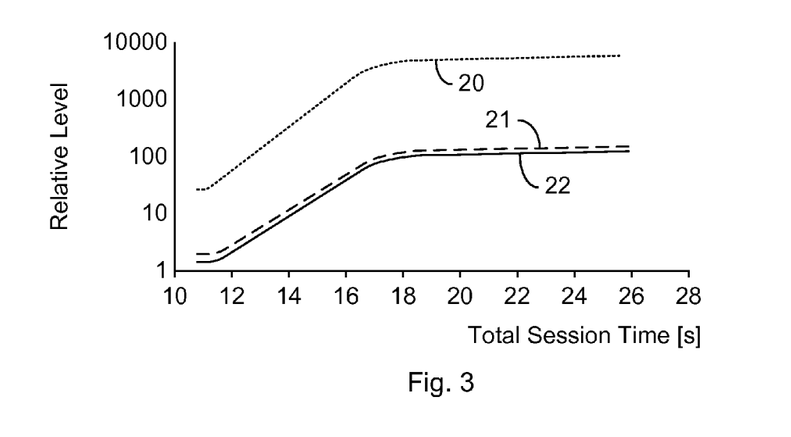
FIG. 3 is a schematic graph illustrating reference performance data in uplink.
Figure 4:
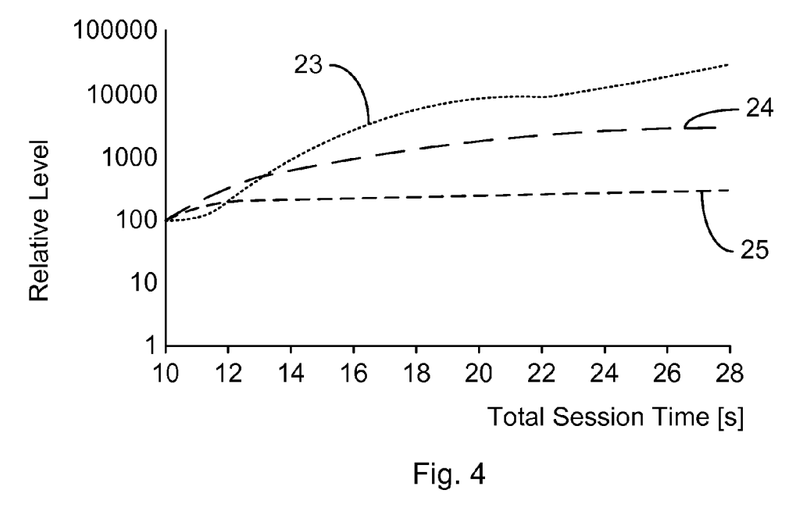
FIG. 4 is a schematic graph illustrating reference performance data in downlink.
Figure 5:
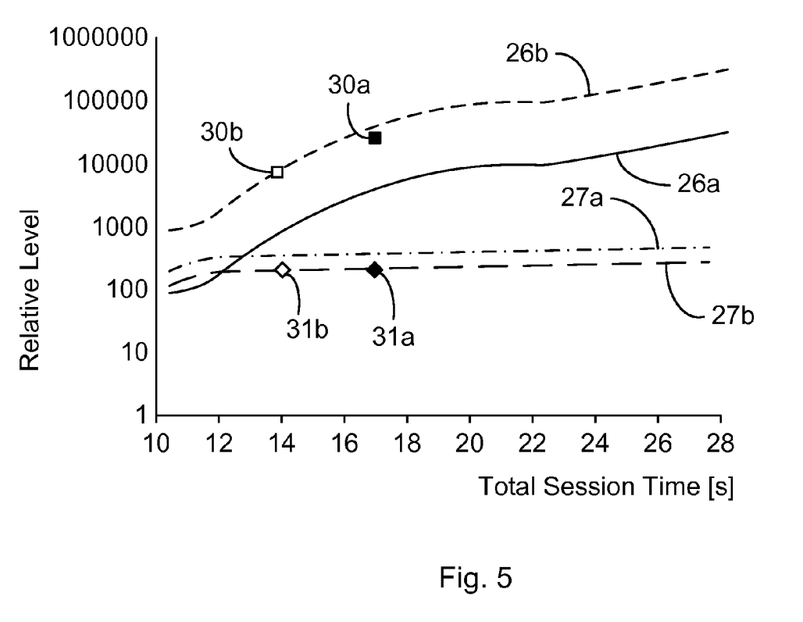
FIG. 5 is a schematic graph illustrating recommended levels for performance data in downlink.

FIGS. 3 to 5 are schematic graphs illustrating performance data in uplink and downlink. In these graphs, the horizontal axis represents session time. The session time is defined as the duration of a cellular data session, where cellular data session is defined as a period when a wireless terminal is in a cellular network connection state when data transfer is possible. The vertical axis represents a relative level of various values on a logarithmic scale. The data shown in FIGS. 3-5 includes reference performance data which is used to evaluate application performance in a cellular network.

The reference performance data comes from statistical data captured from cellular networks, based on application activities and traffic characteristics. In other words, large amount of execution data from cellular data sessions are beforehand recorded from real cellular networks, processed and stored as a database of application execution characteristics. The database is implemented and distributed as part of the SDK and/or evaluator and can thus be used by developers to build and test new applications for smartphones, tablets, etc. The database can be static and updated only when a new in version of the SDK and/or evaluator is released, or the database can be configured to update its data dynamically over the wide area network.

This data can e.g. comprise session time, number of state switches per session, total time spent in specific states per session, and total data sent in each direction in each state. The data is analysed and characterised to serve as the reference performance data for the application development.

The reference performance data base is thus created by using a large number of session samples from one or more cellular networks. Using these samples, the characteristics per sample are calculated, the results are binned based on session time, and the average values per bin are calculated. The results will then provide a good representation of the average characteristics per session based on the session time in the networks measured, and these characteristics can then be used for evaluating new applications to be developed.

The radio energy and the loadtime are calculated by the formula $$\sum_i Component_i \cdot Weight_i \quad (1)$$

where $Component_i$ represents the traffic data per session e.g. in the form of number of state switches during each session, time in each state during the session, and bytes transmitted in each direction in each state. $Weight_i$ represents the different energy or loadtime for each traffic event or byte and consists of constant values measured or calculated in advance. The result from this calculation will provide the resource utilisation of the air interface for the session, and using a subset of the calculation components, the corresponding air interface load for the control plane activities can be calculated and included in the characterisation.

The unit loadtime is defined here due to the fact that in a W-CDMA system, the momentary air interface uplink load is not characterised by transmitted power, but by the load in terms of thermal noise rise, RoT (Rise over Thermal). Corresponding with the definition where energy equals power multiplied by time, loadtime is defined as load multiplied by time, to arrive at a measurement which is equivalent to energy but in the uplink.

It is to be noted that the graphs of FIGS. 3-5 are only examples and are presented to better explain embodiments presented herein. Moreover, only a subset of possible parameters are illustrated in FIGS. 3-5.

Looking now to FIG. 3, this is a schematic graph illustrating reference performance data in uplink. A solid line 22 represents uplink CP (Control Plane) cost (defined in more detail below). A long dashed line 21 represents uplink loadtime and a dotted line 20 represents data magnitude of uplink data transfer.

The values of uplink CP cost, uplink loadtime and data magnitude are all reference performance data.

FIG. 4 is a schematic graph illustrating reference performance data in downlink. A short dashed line 25 represents downlink CP cost. A long dashed line 24 represents downlink energy usage and a dotted line 23 represents data magnitude of downlink data transfer.

FIG. 5 is a schematic graph illustrating recommended levels for performance data in downlink. The recommended values are calculated from reference values, and can e.g. be obtained by multiplying average reference values with a factor, where the factor varies for different parameters (see e.g. Table 9 below).

A solid line 26a represents minimum downlink data and a short dashed line 26b represents recommended downlink data. A dash-dotted line 27a represents maximum downlink CP cost and a long dashed line 27b represents recommended CP cost.

In the graph, the performance of sessions from two respective apps are plotted. A session for a first app has a first downlink data value 30a and a first downlink CP cost value 31a. The downlink data value 30a is clearly above the minimum downlink data line 26a, and almost at the recommended downlink data line 26b. Moreover, the downlink CP cost 31a is on the recommended downlink CP cost line 27b.

All in all, the first app appears to perform decently, with some improvement that can be done particularly in the downlink data value. The developer could address this by moving some time demanding processing which is performed during the cellular data session to instead be performed when the session is not active. This reduces the session time (shifting the plotted values 30a-b to the left), which would make the downlink data value 30a approach or even surpass the recommended downlink data line 26b.

A session for a second app has a second data value 30b and a second downlink CP cost value 31b. The plotted values for this app are on the recommended lines 26b, 27b, whereby it performs better relative to the first app.

Figure 6A:
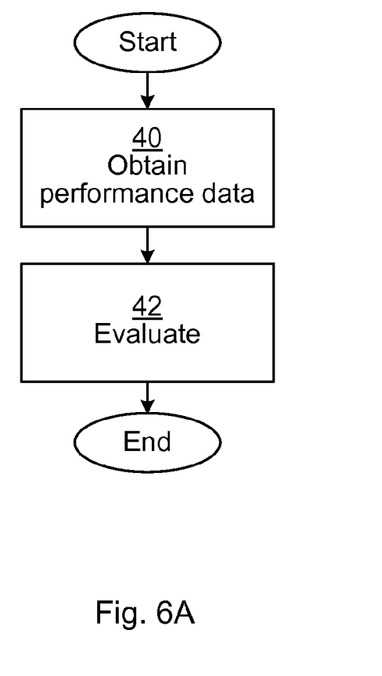
FIGS. 6A-B are flow charts illustrating embodiments of methods for evaluating an application intended to be installed in a wireless terminal of a cellular network.
Figure 6B:
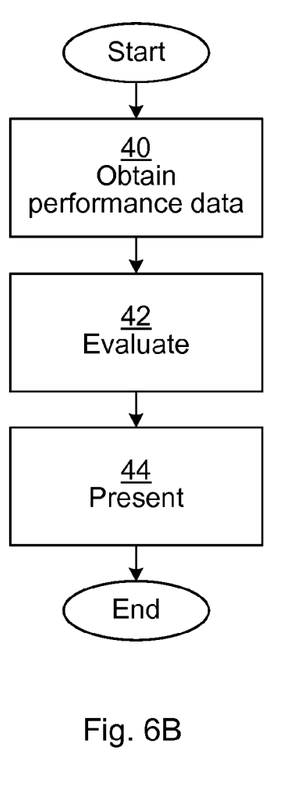

FIGS. 6A-B are flow charts illustrating embodiments of methods for evaluating (also known a benchmarking) an application intended to be installed in a wireless terminal of a cellular network. The method can e.g. be performed in the application development device 7 of FIG. 1.

In an obtain performance data step 40, performance data associated with an execution of the application in a test wireless terminal is obtained. As explained above, the test wireless terminal can be part of a simulated cellular network (within the application development device) or a real cellular network (external to the application development device). The performance data is obtained for each cellular data session of the execution of the application, where each cellular data session is defined as a period when the test wireless terminal is in a cellular network connection state when data transfer is possible. For instance, in W-CDMA, the states when data transfer is possible consists of the following states: CELL_FACH, a state when a Forward Access Channel is available and CELL_DCH, a state when Dedicated Channel is available.

In one embodiment, the cellular network connection state when data transfer is possible consists of a single state of an RRC_CONNECTED (Radio Resource Control Connected) state.

For instance, the performance data can comprise a measurement of data transfer magnitude (e.g. downlink data and/or uplink data), which has proven to be a good measurement of resource usage in a cellular network and which is also easily obtained. Alternatively or additionally, the performance data comprises one or more of the following: number of transferred uplink bytes, number of transferred downlink bytes, time spent in a specific cellular network connection state, number of transitions of cellular network connection states, downlink energy estimate, uplink energy estimate.

Hence, the application development device 7 gathers the performance data required to calculate the characteristics used for evaluation.

In an evaluate step 42, the performance data is evaluated by comparing the performance data with reference performance data. This comparison is based on the duration of each cellular data session.

In order to give guidance to the developer and encourage the smartphone community to in use the networks in an efficient way, recommended and acceptable levels for each characteristic involved can be added to the database (see FIG. 5). These levels can be dynamic or adapted, or just the average levels multiplied by a constant value. These levels will then serve as a recommended target level for the developer. The levels do not need to be imposed or mandatory to reach before approval since that may lead to negative effects like additional data transmission just to reach a recommended level.

The reference performance data database and the analysis software functionality are then built and included in SDK, where it interacts with the application programming interface (API) of the SDK.

This step may comprise comparing the performance data with a strict subset (e.g. bins) of the reference performance data, the strict subset being defined by a range of durations of the cellular data sessions, for reference performance data, in which the duration of the cellular data session falls.

By using the reference performance data from cellular networks, the developer will get quick feedback of how the application performs in various traffic cases.

The method can use different performance data as a discriminating variable, for example the total time spent in connected state, and then evaluate the execution based on this. The statistical characteristics for other applications with the same discriminating variable value are used as comparison, which enables a straight forward yet accurate measure of how the application performs from a network perspective.

Distinction of application category can be included, but in order to get a general performance evaluation, this is not required. Also, such categorisation can be arbitrary in and to work well it requires well defined category definitions to avoid any erroneous categorisations.

Now, the method illustrated in FIG. 6B will be described. Only new or modified steps, compared to the method of FIG. 6A, will be described here.

In a present step 44, a result of the evaluating of performance data is presented to the user of the application development device.

Optionally, this step comprises presenting recommendations indicating recommended performance data values (as shown in FIG. 5 and described above).

Also, the performance data can optionally be included when the application is presented by the application provider 9, whereby there is a greater incentive for the application developer to develop applications which are efficient in their usage of the cellular network.

An example will now be described for further illustration. The example explains how a reference database is created for application development, and then applying this reference database to get a performance evaluation measurement for the application under development. The example will for clarity only use a small set of data, but nothing prevents the method to be scaled up to more realistic data set volumes; i.e. thousands or millions of samples.

From a live network, samples of user data are captured. Each sample describes a session from the connection setup until the session is terminated. In a cellular network, the connection usually is kept as short as possible to preserve radio resources, leading to session termination after a short time of inactivity. Hence a session usually only consists of a burst of packets, all related to the same task e.g. watching a video clip or opening a web page.

The information collected per sample is: the time spent in active states (e.g. for WCDMA CELL_DCH and CELL_FACH states), the data sent in either direction and in either state, and the number of transitions between states. All this will describe the session from a utilisation perspective of the air interface resources, which is typically the most scarce resource in a cellular network.

A few samples of reference performance data is shown in Table 1:

TABLE 1

Samples of reference performance data

| Sample | data_dch_ul | data_dch_dl | data_fach_ul | data_fach_dl | time_dch | time_fach |
|---|---|---|---|---|---|---|
| 1 | 0 | 0 | 32 | 80 | 0 | 10.04 |
| 2 | 1677 | 5898 | 244 | 204 | 3.6 | 12.44 |
| 3 | 5968 | 22634 | 606 | 1004 | 8.17 | 21.1 |
| 4 | 742 | 370 | 171 | 179 | 3.08 | 12.05 |
| 5 | 3189 | 8677 | 482 | 890 | 5.45 | 14.76 |
| 6 | 1989 | 5931 | 280 | 278 | 4.28 | 12.87 |
| 7 | 4201 | 10108 | 512 | 911 | 6.2 | 15.99 |
| 8 | 0 | 0 | 32 | 80 | 0 | 10.78 |
| 9 | 5454 | 32005 | 568 | 945 | 6.33 | 19.2 |
| 10 | 0 | 0 | 40 | 120 | 0 | 11.45 |
| 11 | 0 | 0 | 32 | 80 | 0 | 10.53 |
| 12 | 2105 | 8169 | 414 | 557 | 4.89 | 13.76 |
| 13 | 2023 | 6074 | 302 | 367 | 4.64 | 12.95 |
| 14 | 0 | 0 | 32 | 80 | 0 | 10.15 |
| 15 | 0 | 0 | 32 | 80 | 0 | 10.76 |

| Sample | ura2fachNW | ura2fachUE | fach2dch | dch2fach | fach2ura | ura2dch |
|---|---|---|---|---|---|---|
| 1 | 1 | 0 | 0 | 0 | 1 | 0 |
| 2 | 0 | 1 | 1 | 1 | 1 | 0 |
| 3 | 0 | 1 | 2 | 2 | 1 | 0 |
| 4 | 0 | 1 | 1 | 1 | 1 | 0 |
| 5 | 0 | 1 | 1 | 1 | 1 | 0 |
| 6 | 0 | 1 | 1 | 1 | 1 | 0 |
| 7 | 1 | 0 | 1 | 1 | 1 | 0 |
| 8 | 1 | 0 | 0 | 0 | 1 | 0 |
| 9 | 1 | 0 | 1 | 1 | 1 | 0 |
| 10 | 1 | 0 | 0 | 0 | 1 | 1 |
| 11 | 1 | 0 | 0 | 0 | 1 | 1 |
| 12 | 0 | 1 | 1 | 1 | 1 | 0 |
| 13 | 0 | 1 | 1 | 1 | 1 | 0 |
| 14 | 1 | 0 | 0 | 0 | 1 | 0 |
| 15 | 1 | 0 | 0 | 0 | 1 | 0 |

In Table 1, the following parameters are used:
data_dch_ul: Total number of bytes send in DCH state in UL during the session,
data_dch_dl: Total number of bytes send in DCH state in DL during the session,
data_fach_ul: Total number of bytes send in FACH state in UL during the session,
data_fach_dl: Total number of bytes send in FACH state in DL during the session,
time_dch: Total time [sec] spent in DCH state during the session,
time_fach: Total time [sec] spent in FACH state during the session,
ura2fachNW: Total number of network initiated state transitions from URA to FACH during the session,
ura2fachUE: Total number of device initiated state transitions from URA to FACH during the session,
fach2dch: Total number of state transitions from FACH to DCH state during the session,
dch2fach: Total number of state transitions from DCH to FACH state during the session,
fach2ura: Total number of state transitions from FACH to URA state during the session,
ura2dch: Total number of state transitions from URA to DCH state during the session.

The session samples of reference performance data, as given in the example in Table 1, are fed into a formula to calculate the radio interface energy utilised in each session, separated into the DL energy and the UL loadtime. The formula is a sum of products, where each of the session characteristics are multiplied with a specific weight and summed up to a total value per direction, in accordance with formula (1) above.

The components in (1) are here the characteristics outlined in the table above, and the weights are as follows:

DL Energy:
  DL_Cost_data_dch_ul=0
  DL_Cost_data_dch_dl=0.062
  DL_Cost_data_fach_ul=0
  DL_Cost_data_fach_dl=0.5676
  DL_Cost_time_dch=11.64
  DL_Cost_time_fach=0
  DL_Cost_ura2fachNW=72.77
  DL_Cost_ura2fachUE=45.41
  DL_Cost_fach2dch=60.03
  DL_Cost_dch2fach=25.44
  DL_Cost_fach2ura=22.7
  DL_Cost_ura2dch=82.74

UL Loadtime:
  UL_Cost_data_dch_ul=0.003
  UL_Cost_data_dch_dl=0
  UL_Cost_data_fach_ul=0.016
  UL_Cost_data_fach_dl=0
  UL_Cost_time_dch=15.473
  UL_Cost_time_fach=0
  UL_Cost_ura2fachNW=0.435
  UL_Cost_ura2fachUE=0.435
  UL_Cost_fach2dch=0.692
  UL_Cost_dch2fach=0.869
  UL_Cost_fach2ura=0.435
  UL_Cost_ura2dch=0.692

For the total resource usage in each direction the total sum of products applies, resulting in the values in Table 2:

TABLE 2

Calculated DL energy and UL loadtime

| Sample | DL Energy | UL LoadTime |
|---|---|---|
| 1 | 141 | 1 |
| 2 | 678 | 68 |
| 3 | 2 313 | 160 |
| 4 | 314 | 55 |
| 5 | 1 262 | 105 |
| 6 | 730 | 80 |
| 7 | 1 399 | 121 |
| 8 | 141 | 1 |
| 9 | 2 783 | 128 |
| 10 | 246 | 2 |
| 11 | 224 | 2 |
| 12 | 1 035 | 92 |
| 13 | 794 | 86 |
| 14 | 141 | 1 |
| 15 | 141 | 1 |

The unit for the DL energy is mWs, whereas the UL loadtime is unitless, based on thermal noise rise.

For the resource usage for control plane activities, the sum of the costs for state transitions and residing in a state applies:

$$\text{DL CP Cost} = \text{StateCost DL} + \text{TransCost DL} \quad (2)$$

$$\text{StateCost DL} = \text{DL\_Cost\_time}_{dch} \cdot \text{time}_{dch} + \text{DL\_Cost\_time}_{fach} \cdot \text{time}_{fach} \quad (3)$$

$$\begin{aligned}\text{TransCost DL} =\ &\text{DL\_Cost\_ura2fachNW} \cdot \text{ura2fachNW} + \\ &\text{DL\_Cost\_ura2fachUE} \cdot \text{ura2fachUE} + \\ &\text{DL\_Cost\_fach2dch} \cdot \text{fach2dch} + \\ &\text{DL\_Cost\_dch2fach} \cdot \text{dch2fach} + \\ &\text{DL\_Cost\_fach2ura} \cdot \text{fach2ura} + \\ &\text{DL\_Cost\_ura2dch} \cdot \text{ura2dch}\end{aligned} \quad (4)$$

$$\text{UL CP Cost} = \text{StateCost UL} + \text{TransCost UL}$$

$$\text{StateCost UL} = \text{UL\_Cost\_time}_{dch} \cdot \text{time}_{dch} + \text{UL\_Cost\_time}_{fach} \cdot \text{time}_{fach} \quad (5)$$

$$\begin{aligned}\text{TransCost UL} =\ &\text{UL\_Cost\_ura2fachNW} \cdot \text{ura2fachNW} + \\ &\text{UL\_Cost\_ura2fachUE} \cdot \text{ura2fachUE} + \\ &\text{UL\_Cost\_fach2dch} \cdot \text{fach2dch} + \\ &\text{UL\_Cost\_dch2fach} \cdot \text{dch2fach} + \\ &\text{UL\_Cost\_fach2ura} \cdot \text{fach2ura} + \\ &\text{UL\_Cost\_ura2dch} \cdot \text{ura2dch}\end{aligned} \quad (6)$$

When calculated, the values of the CP cost for the 15 session samples in Table 1 are shown in Table 3:

TABLE 3

CP costs

| Sample | DL CP Cost | UL CP Cost |
|---|---|---|
| 1 | 95 | 1 |
| 2 | 195 | 58 |
| 3 | 334 | 130 |
| 4 | 189 | 50 |
| 5 | 217 | 87 |
| 6 | 203 | 69 |
| 7 | 253 | 98 |
| 8 | 95 | 1 |
| 9 | 255 | 100 |
| 10 | 178 | 2 |
| 11 | 178 | 2 |
| 12 | 210 | 78 |
| 13 | 208 | 74 |
| 14 | 95 | 1 |
| 15 | 95 | 1 |

The total data consumption can also be summed up per session sample $$\text{Total DL Data} = \text{data\_dch\_dl} + \text{data\_fach\_dl} \quad (7)$$

$$\text{Total UL Data} = \text{data\_dch\_ul} + \text{data\_fach\_ul} \quad (8)$$

which will result in the following data volumes per sample:

TABLE 4

Data magnitudes for samples

| Sample | DL Data | UL Data |
|---|---|---|
| 1 | 80 | 32 |
| 2 | 6 102 | 1 921 |
| 3 | 23 638 | 6 574 |
| 4 | 549 | 913 |
| 5 | 9 567 | 3 671 |
| 6 | 6 209 | 2 269 |
| 7 | 11 019 | 4 713 |
| 8 | 80 | 32 |
| 9 | 32 950 | 6 022 |
| 10 | 120 | 40 |
| 11 | 80 | 32 |
| 12 | 8 726 | 2 519 |
| 13 | 6 441 | 2 325 |
| 14 | 80 | 32 |
| 15 | 80 | 32 |

The total session time is also calculated according to:

$$\text{Total Time} = \text{time}_{dch} + \text{time}_{fach} \quad (9)$$

The total time is thus equal to the session time. This results in the total times per session shown in Table 5:

TABLE 5

Total time for samples

| Sample | Total Time |
|---|---|
| 1 | 29.27 |
| 2 | 10.51 |
| 3 | 14.28 |
| 4 | 14.85 |
| 5 | 10.51 |
| 6 | 14.19 |
| 7 | 20.19 |
| 8 | 23.83 |
| 9 | 10.51 |
| 10 | 10.51 |
| 11 | 13.78 |
| 12 | 24.65 |
| 13 | 10.51 |
| 14 | 17.96 |
| 15 | 12.87 |

Table 6 then shows the calculated values per session sample for used air interface resources, control plane share of the resource usage, the total data volume transferred, and the total session time, are then sorted according to the total time for each session:

TABLE 6

Summary of calculated values of samples

| Sample | Total Time | DL Engery | UL LoadTime | DL CP Cost | UL CP Cost | UL Data | UL Data |
|---|---|---|---|---|---|---|---|
| 1 | 10.04 | 141 | 1 | 95 | 1 | 80 | 32 |
| 14 | 10.15 | 141 | 1 | 95 | 1 | 80 | 32 |
| 11 | 10.53 | 224 | 2 | 178 | 2 | 80 | 32 |
| 15 | 10.76 | 141 | 1 | 95 | 1 | 80 | 32 |
| 8 | 10.78 | 141 | 1 | 95 | 1 | 80 | 32 |

TABLE 6-continued

Summary of calculated values of samples

| Sample | Total Time | DL Engery | UL LoadTime | DL CP Cost | UL CP Cost | UL Data | UL Data |
|---|---|---|---|---|---|---|---|
| 10 | 11.45 | 246 | 2 | 178 | 2 | 120 | 40 |
| 4 | 15.13 | 314 | 55 | 189 | 50 | 549 | 913 |
| 2 | 16.04 | 678 | 68 | 195 | 58 | 6 102 | 1 921 |
| 6 | 17.15 | 730 | 80 | 203 | 69 | 6 209 | 2 269 |
| 13 | 17.59 | 794 | 86 | 208 | 74 | 6 441 | 2 325 |
| 12 | 18.65 | 1 035 | 92 | 210 | 78 | 8 726 | 2 519 |
| 5 | 20.21 | 1 262 | 105 | 217 | 87 | 9 567 | 3 671 |
| 7 | 22.19 | 1 399 | 121 | 253 | 98 | 11 019 | 4 713 |
| 9 | 25.53 | 2 783 | 128 | 255 | 100 | 32 950 | 6 022 |
| 3 | 29.27 | 2 313 | 160 | 334 | 130 | 23 638 | 6 574 |

The samples are then binned into suitable bins, providing a good representation of the session time value span, as shown in Table 7:

TABLE 7

Samples placed in bins based on total time.

| Bin | Sample | Total Time | DL Energy | UL LoadTime | DL CP Cost | UL CP Cost | DL Data | UL Data |
|---|---|---|---|---|---|---|---|---|
| 0-11 | 1 | 10.04 | 141 | 1 | 95 | 1 | 80 | 32 |
|  | 14 | 10.15 | 141 | 1 | 95 | 1 | 80 | 32 |
|  | 11 | 10.53 | 224 | 2 | 178 | 2 | 80 | 32 |
|  | 15 | 10.76 | 141 | 1 | 95 | 1 | 80 | 32 |
|  | 8 | 10.78 | 141 | 1 | 95 | 1 | 80 | 32 |
| 11-15 | 10 | 11.45 | 246 | 2 | 178 | 2 | 120 | 40 |
| 15-20 | 4 | 15.13 | 314 | 55 | 189 | 50 | 549 | 913 |
|  | 2 | 16.04 | 678 | 68 | 195 | 58 | 6 102 | 1 921 |
|  | 6 | 17.15 | 730 | 80 | 203 | 69 | 6 209 | 2 269 |
|  | 13 | 17.59 | 794 | 86 | 208 | 74 | 6 441 | 2 325 |
|  | 12 | 18.65 | 1 035 | 92 | 210 | 78 | 8 726 | 2 519 |
| 20-25 | 5 | 20.21 | 1 262 | 105 | 217 | 87 | 9 567 | 3 671 |
|  | 7 | 22.19 | 1 399 | 121 | 253 | 98 | 11 019 | 4 713 |
| >25 | 9 | 25.53 | 2 783 | 128 | 255 | 100 | 32 950 | 6 022 |
|  | 3 | 29.27 | 2 313 | 160 | 334 | 130 | 23 638 | 6 574 |

Within each bin, average values are then calculated for each characteristic as shown in Table 8. These values can then be used for evaluating the execution characteristics for applications.

TABLE 8

Average characteristic values per bin.

| Bin | DL Energy | DL CP Cost | DL Data | UL LoadTime | UL CP Cost | UL Data |
|---|---|---|---|---|---|---|
| 0-11 | 157 | 112 | 80 | 2 | 1 | 32 |
| 11-15 | 246 | 178 | 120 | 2 | 2 | 40 |
| 15-20 | 710 | 201 | 5 605 | 76 | 66 | 1 989 |
| 20-25 | 1 331 | 235 | 10 293 | 113 | 93 | 4 192 |
| >25 | 2 548 | 294 | 28 294 | 144 | 115 | 6 298 |

These values will serve as the base for providing reference values for evaluating app performance. However, a scaling can be done in order to set more aggressive target values than just the current average values. To drive improved performance and enhanced utilisation of the radio resources, higher activity and more efficient utilisation per connected time unit are encouraged.

This means that more transferred bytes and less control plane activities are desired in relation to a session time, and since the vast majority of the air interface energy used comes from data transfers, higher total energy per time unit will be used. In this example, recommended levels are created from the average levels by multiplying with the following factors:

TABLE 9

Factors for calculating recommended values

| DL Energy: | 10 |
| DL Data: | 10 |
| Max DL CP Cost: | 2 |
| DL Load Time | 5 |
| UL Data: | 5 |
| Max UL CP Cost: | 2 |

This results in a database for evaluating app performance, which obviously will be of better resolution using millions of samples and preferably smaller bins.

Figure 7:
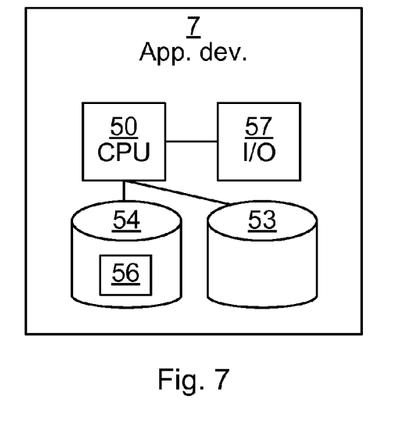
FIG. 7 is a schematic diagram showing some components of the radio network node of FIG. 1.

FIG. 7 is a schematic diagram showing some components of the application development device 7 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIGS. 6A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM). The data memory 53 can e.g. store reference performance data.

The application development device 7 further comprises an I/O interface 57 for communicating with other external entities. The I/O interface 67 also includes a user interface, e.g. comprising a keyboard, a mouse/trackpad, display, etc. Speakers and/or a microphone may also form part of the I/O interface 67.

Other components of the application development device 7 are omitted in order not to obscure the concepts presented herein.

Figure 8:
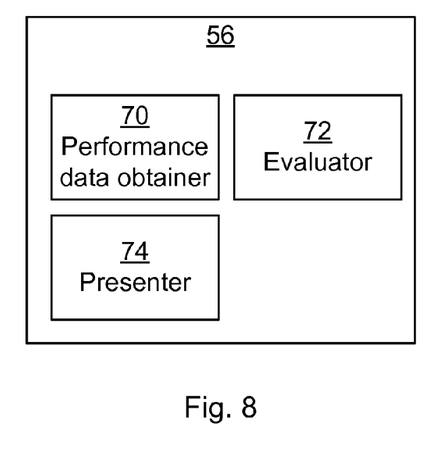
FIG. 8 is a schematic diagram showing functional modules of the software instructions of the radio network node of FIG. 5 according to one embodiment.

FIG. 8 is a schematic diagram showing functional modules of the software instructions 56 of the application development device of FIG. 7 according to one embodiment. The modules are implemented using software instructions such as a computer program in executing in the application development device 7. The modules correspond to the steps in the methods illustrated in FIGS. 6A-B.

A performance data obtainer 70 is arranged to obtain performance data associated with an execution of the application in a test wireless terminal in a simulated or real cellular network. This module corresponds to the obtain performance data step 40 of FIGS. 6A-B.

An evaluator 72 is arranged to evaluate the performance data by comparing the performance data with reference performance data. This module corresponds to the evaluate step 42 of FIGS. 6A-B.

A presenter 74 is arranged to present a result of the evaluating of performance data. This module corresponds to the present step 44 of FIG. 6B.

Figure 9:
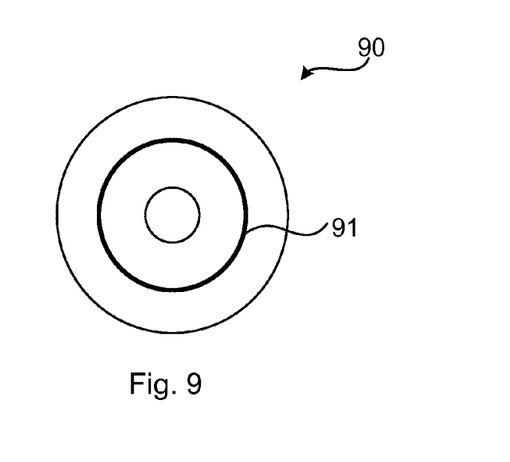
FIG. 9 shows one example of a computer program product comprising a computer readable medium.

FIG. 9 shows one example of a computer program product 90 comprising a computer readable medium. On this computer readable medium a computer program 91 can be stored, which computer program includes code that can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 54 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments in than the ones disclosed above are equally possible within the scope of the invention, as defined by the appended patent claims.

The invention claimed is:

1. A method for evaluating an application intended to be installed in a wireless terminal of a cellular network, the method being performed in an application development device and comprising the steps of:
    obtaining performance data associated with an execution of the application in a test wireless terminal in a simulated or real cellular network, the performance data being obtained by the application development device for each cellular data session between the test wireless terminal and the application development device during the execution of the application, each cellular data session being defined as a period when the test wireless terminal is in a cellular network connection state when data transfer is possible;
    evaluating the performance data by comparing the performance data for each cellular data session with recommended reference performance data of an application provider, the recommended reference performance data determined based on the duration of each cellular data session and corresponding to the obtained performance data, wherein evaluating the performance further comprises comparing the performance data with a strict subset of the recommended reference performance data, the strict subset being defined by a range of durations of the cellular data sessions, for recommended reference performance data, in which the duration of the cellular data session falls; and
    presenting recommendations indicating recommended performance data values.

2. The method according to claim 1, wherein in the step of obtaining performance data, the performance data comprises a measurement of data transfer magnitude.

3. The method according to claim 1, wherein in the step of obtaining performance data, the performance data comprises at least one of the following: number of transferred uplink bytes, number of transferred downlink bytes, time spent in a specific cellular network connection state, number of transitions of cellular network connection states, downlink energy estimate, and uplink energy estimate.

4. The method according to claim 1, wherein the cellular network connection states when data transfer is possible are only CELL_FACH, a state when a Forward Access Channel is available, and CELL_DCH, a state when Dedicated Channel is available.

5. The method according to claim 1, wherein the cellular network connection state when data transfer is possible consists of a single state of an RRC_CONNECTED, Radio Resource Control Connected, state.

6. An application development device arranged to evaluate an application intended to be installed in a wireless terminal of a cellular network, application development device comprising:
    a processor; and
    a memory storing instructions that, when executed by the processor, cause the application development device to:
        obtain performance data associated with an execution of the application in a test wireless terminal in a simulated or real cellular network, the performance data being obtained by the application development device for each cellular data session between the test wireless terminal and the application development device during the execution of the application, each cellular data session being defined as a period when the test wireless terminal is in a cellular network connection state when data transfer is possible;
        evaluate the performance data by comparing the performance data for each cellular data session with recommended reference performance data, the recommended reference performance data selected based on the duration of each cellular data session and corresponding to the obtained performance data, wherein evaluating the performance further comprises comparing the performance data with a strict subset of the recommended reference performance data, the strict subset being defined by a range of durations of the cellular data sessions, for recommended reference performance data, in which the duration of the cellular data session falls; and
        present recommendations indicating recommended performance data values.

7. The application development device according to claim 6, wherein the instructions to obtain comprise instructions that, when executed by the processor, cause the application development device to obtain performance data comprising a measurement of data transfer magnitude.

8. The application development device according to claim 6, wherein the instructions to obtain comprise instructions that, when executed by the processor, cause the application development device to obtain performance data comprising at least one of the following: number of transferred uplink bytes, number of transferred downlink bytes, time in spent in a specific cellular network connection state, number of transitions of cellular network connection states, downlink energy estimate, and uplink energy estimate.

9. The application development device according to claim 6, wherein the instructions to obtain performance data comprise instructions that, when executed by the processor, cause the application development device to consider the cellular network connection states when data transfer is possible are only CELL_FACH, a state when Forward Access Channel is available, and CELL_DCH, a state when Dedicated Channel is available.

10. The application development device according to claim 6, wherein the instructions to obtain performance data comprise instructions that, when executed by the processor, cause the application development device to consider the cellular network connection states when data transfer is possible to consist of a single state of an RRC_CONNECTED, Radio Resource Control Connected, state.

11. The application development device according to claim 6, wherein the instructions to evaluate the performance comprise instructions that, when executed by the processor, cause the application development device to compare the performance data with a strict subset of the recommended reference performance data, the strict subset being defined by a range of durations of the cellular data sessions, for the recommended reference performance data, in which the duration of the cellular data session falls.

12. A computer program product for evaluating an application intended to be installed in a wireless terminal of a cellular network, the computer program product comprising a non-transitory computer-readable medium having instructions thereon, the instructions comprising:

code for obtaining performance data associated with an execution of the application in a test wireless terminal in a simulated or real cellular network, the performance data being obtained by an application development device for each cellular data session between the test wireless terminal and the application development device during the execution of the application, each cellular data session being defined as a period when the test wireless terminal is in a cellular network connection state when data transfer is possible;

code for evaluating the performance data by comparing the performance data for each cellular data session with recommended reference performance data, the recommended reference performance data selected based on the duration of each cellular data session and corresponding to the obtained performance data, wherein evaluating the performance further comprises comparing the performance data with a strict subset of the recommended reference performance data, the strict subset being defined by a range of durations of the cellular data sessions, for recommended reference performance data, in which the duration of the cellular data session falls; and code for presenting recommendations indicating recommended performance data values.

* * * * *